United States Patent
Gray et al.

(10) Patent No.: US 9,915,078 B2
(45) Date of Patent: Mar. 13, 2018

(54) STRUCTURAL YIELDING FUSE

(71) Applicant: CAST CONNEX CORPORATION, Toronto (CA)

(72) Inventors: Michael Gray, Toronto (CA); Juan-Carlos De Oliveira, Toronto (CA); Constantin Christopoulos, Toronto (CA)

(73) Assignee: CAST CONNEX COPRORATION, Toronto (CA)

( * ) Notice: Subject to any disclaimer, the term of this patent is extended or adjusted under 35 U.S.C. 154(b) by 0 days.

(21) Appl. No.: 15/318,126

(22) PCT Filed: Jun. 18, 2014

(86) PCT No.: PCT/CA2014/050572
§ 371 (c)(1),
(2) Date: Dec. 12, 2016

(87) PCT Pub. No.: WO2015/192200
PCT Pub. Date: Dec. 23, 2015

(65) Prior Publication Data
US 2017/0107734 A1    Apr. 20, 2017

(51) Int. Cl.
*E04H 9/02* (2006.01)
*E04B 1/24* (2006.01)
*E04B 1/36* (2006.01)

(52) U.S. Cl.
CPC .......... *E04H 9/021* (2013.01); *E04B 1/2403* (2013.01); *E04B 1/36* (2013.01); *E04H 9/024* (2013.01); *E04B 2001/2415* (2013.01); *E04B 2001/2442* (2013.01)

(58) Field of Classification Search
CPC ......... E04H 9/028; E04H 9/024; E04H 9/023; E04H 9/021; E04H 9/027; E04H 9/02; E04B 1/2403
See application file for complete search history.

(56) References Cited

U.S. PATENT DOCUMENTS

| | | | | |
|---|---|---|---|---|
| 4,823,522 A * | 4/1989 | White | ..................... | E04H 9/022 14/73.5 |
| 5,533,307 A * | 7/1996 | Tsai | ........................ | E04H 9/021 52/167.1 |
| 8,590,220 B2 * | 11/2013 | Ozaki | ........................ | E04H 9/02 52/167.1 |

FOREIGN PATENT DOCUMENTS

| | | | | |
|---|---|---|---|---|
| JP | 2007332575 | 12/2007 | | |
| WO | WO2008138143 | * 11/2008 | ............... | E04H 9/02 |

* cited by examiner

*Primary Examiner* — Jessica L Laux
(74) *Attorney, Agent, or Firm* — Elan IP Inc.

(57) ABSTRACT

A yielding fuse for use in a brace assembly includes a first body portion configured to be connected at one end to a side of a brace member of the brace assembly, and a second body portion configured to be connected at one end to another side of the brace member of the brace assembly. The first and second body portions are positioned so as to be disposed on opposite sides of an axis defined by the brace member, with each of the first and second body portions further including a base displaced from the axis, a plurality of yielding arms extending from the base towards the axis and at least a first connecting plate rigidly connecting the first body portion to the second body portion. Preferably, a second connecting plate is also provided.

14 Claims, 8 Drawing Sheets

STRUCTURAL YIELDING FUSE

FIELD OF THE INVENTION

The invention relates generally to structural building members, and more particularly to a connecting element for controlled yielding of structural members under seismic, or similar, loading.

BACKGROUND OF THE INVENTION

Many building structure designs include the use of diagonal braces to provide lateral stability, especially for the purpose of increasing the lateral stiffness of the structure and reducing the cost of construction. In such bracing systems it is known that one or more sacrificial yielding fuse elements may be implemented in order to dissipate seismic input energy in the event of dynamic loading, such as during a severe seismic event. Such sacrificial yielding fuse elements can be designed to provide improved seismic performance and reduced seismic loads when compared to traditional lateral load resisting systems.

Many prior art systems require a buckling restraining apparatus used in conjunction with a yielding member, and make use of axially yielding members, whereas it would be advantageous to use flexural yielding elements as they are less prone to fracture caused by excessive inelastic straining.

U.S. Pat. No. 4,823,522 to White, U.S. Pat. No. 4,910,929 to Scholl and U.S. Pat. No. 5,533,307 to Tsai and Li all describe steel yielding fuse elements that are placed at the centre of a beam and are used to add damping and stiffness to a seismically loaded moment resisting frame. The damping elements are generally formed with steel plates that are cut into triangular shapes and welded or bolted to a rigid base. Also, these elements are generally installed at the centre of the upper brace in and inverted V-type braced frame. Thus the yielding of these elements is controlled by the inter-story displacement of the frame. However, a yielding element that was linked to the brace elongation rather than the inter-story displacement would integrate more easily with current construction practices.

Another prior art fuse system, the EaSy Damper, uses a complex fabricated device to improve the seismic performance of brace elements by replacing axial yielding and buckling of the brace with combined flexural and shear yielding of a perforated, stiffened steel plate. The shapes of these plates do not result in constant curvature of the yielding elements and thus lead to undesirable strain concentrations.

Both of the aforementioned prior art systems require painstaking cutting and welding fabrication. Furthermore, the limited geometry of currently available rolled steel products restricts the potential geometry of the critical yielding elements of such devices.

Having greater control of the geometry of the flexural yielding elements permits control of not only the force at which the fuse yields, but also the elastic and post yield stiffnesses of the fuse as well as the displacement associated with the onset of fuse yielding. With casting technology a better performing fuse can be designed and manufactured. Also, free geometric control would enable the design of a part that would more easily integrate with existing steel building erection and fabrication practices than the prior art.

Another prior art system described in U.S. Pat. No. 8,683,758 to Christopoulos et al. describes a yielding fuse which includes elements that yield flexurally when a brace member moves in an axial direction, with the bracing assembly under either tensile or compressive loading conditions. The yielding fuse is connected co-axially with diagonal braces in a building structure. The non-yielding elements of this yielding fuse, the elastic portions, must be designed to resist axial, flexural, and shear forces. The end of each yielding arm is connected via bolts to a fabricated plate assembly, which is in turn connected to a structural gusset plate. At the other end of the fuse, the elastic portions are connected to the structural brace member. The Christopoulos et al. fuse requires substantial cast material to be provided in the elastic portions, and the design is fairly complex owing to the necessity to design for flexural, shear, and axial forces.

It is therefore an object of the invention to provide an improved yielding fuse.

SUMMARY OF THE INVENTION

According to one embodiment of the invention, there is provided a yielding fuse for use in a brace assembly including a first body portion configured to be connected at one end to a side of a brace member of the brace assembly and a second body portion configured to be connected at one end to another side of the brace member of the brace assembly. The first and second body portions are positioned so as to be disposed on opposite sides of an axis defined by the brace member. Each of the first and second body portions further include a base displaced from the axis, a plurality of yielding arms extending from the base towards the axis, and a first connecting plate rigidly connecting the first body portion to the second body portion.

According to one aspect of this embodiment, the plurality of yielding arms includes a bottom portion attached to the base and a top portion distal from the bottom portion.

According to another aspect of this embodiment, the plurality of yielding arms are tapered such that the bottom portion is thicker than the top portion.

According to another aspect of this embodiment, there is further provided a means for connecting the first and second body portions to the beam-column intersection of a building frame.

According to another aspect of this embodiment, the means for connecting includes a splice plate connected to the beam-column intersection and a first support plate connected to the splice plate; the first support plate connected to at least two of the plurality of yielding arms to connect the splice plate to the first and second body portions.

According to another aspect of this embodiment, there is further provided a second support plate; wherein the first support plate and the second support plate are configured, sized and otherwise dimensioned to be connected to opposite ends of the top portion of the plurality of yielding arms on each of the first and second body portions.

According to another aspect of this embodiment, there is further provided a second connecting plate rigidly connecting the first body portion and the second body portion.

According to another aspect of this embodiment, the first connecting plate is connected to a front surface of the first and second body portions and the second plate is connected to a back surface of the first and second body portions.

According to another aspect of this embodiment, the first connecting plate is generally parallel and optionally co-planar with a front surface of the brace member and the second connecting plate is generally parallel and optionally co-planar with a back surface of the brace member.

According to another aspect of this embodiment, the first and second connecting plates are welded to the first and second body portions.

According to a second embodiment of the invention, there is provided a brace assembly including at least one brace member defining an axis and connected to a structural frame by a yielding fuse. The yielding fuse is substantially as has been summarized with respect to the first embodiment, or described elsewhere in this application.

BRIEF DESCRIPTION OF THE DRAWINGS

Embodiments will now be described, by way of example only, with reference to the attached Figures, wherein.

DETAILED DESCRIPTION OF THE EMBODIMENTS

The improved structural yielding fuse of the invention is an improvement to the earlier described U.S. Pat. No. 8,683,758 to Christopoulos et al., the contents of which in their entirety are herein incorporated by reference. However, the yielding fuse as herein described includes improvements which are generally applicable in the art and includes advantages over the prior art including one or more of using less material in construction, ease of attachment to other elements in the structural frame, and replacability following an earthquake. Other advantages may also become apparent to one skilled in the art.

Figure 1:
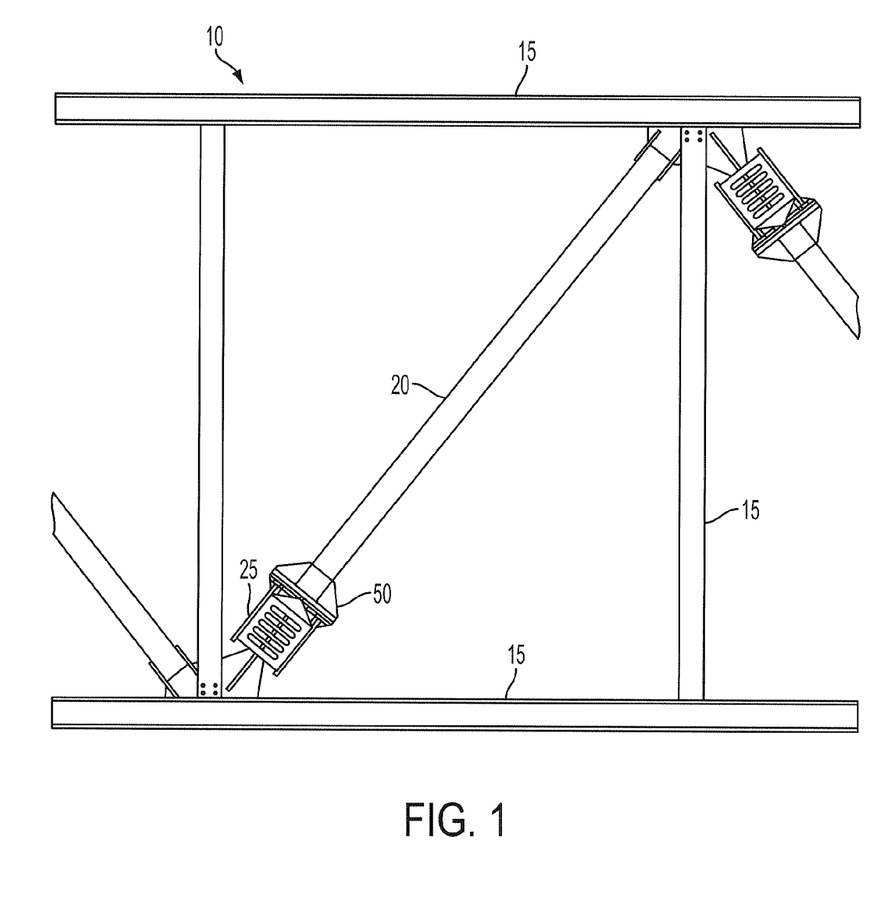
FIG. 1 is a front view of a brace assembly using the yielding fuse of the invention.

With reference now to FIG. 1, there is shown a typical braced frame 10 including a plurality of frame members 15 and at least one brace member 20. The yielding fuse 25 to which the invention is primarily directed connects the brace members 20 to a beam-column intersection of the braced frame. The brace member 20 defines an axis along which the yielding fuse 25 is arranged coaxially, such that during normal loading conditions, or no-load conditions, the yielding fuse 25 functions as an extension of the brace member in a manner indistinguishable therefrom. The yielding fuse 25 is designed to only yield under exceptional loads, such as those that occur during major seismic events. The operation and purpose of yielding fuses in general is described in the aforementioned Christopoulos et al. publication, and are thus not described in detail in this application. In brief, however, the yielding fuse is designed and adapted to yield when the brace assembly is subjected to exceptional loads, such as those that occur during major seismic events. The yielding fuse, being designed to yield, protects the structural integrity of other elements of the braced frame by isolating the location where the braced frame first yields. The brace member 20 is any typical structural steel shape (W-Shape, Hollow Structural Section, etc.). Brace members of this sort, as well as their profiles and shapes, are generally known in the art and the teachings of this invention may be applied to a variety of forms and arrangements of the brace members and braced frames.

Figure 2:
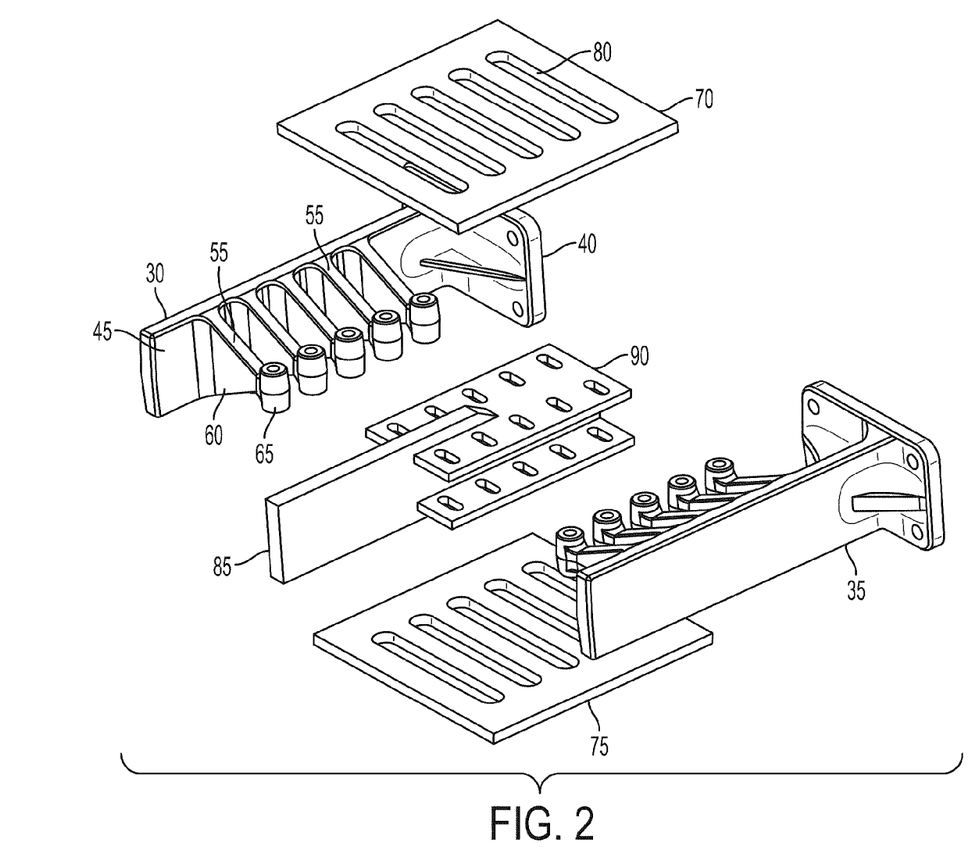
FIG. 2 is an exploded view of the yielding fuse of the invention.
Figure 5:
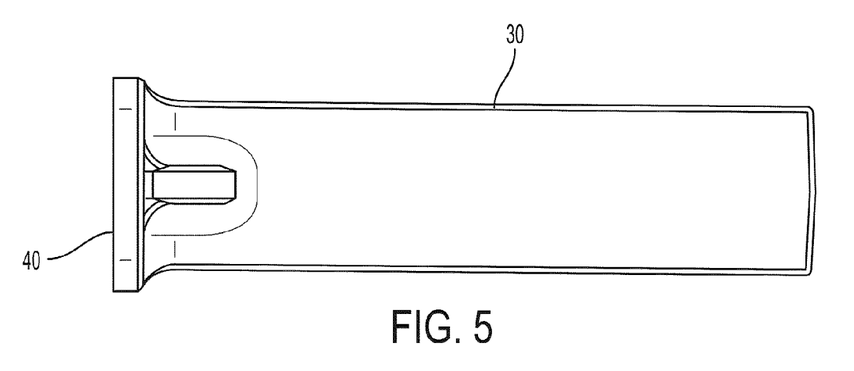
FIG. 5 is a bottom view of the body portion of FIG. 3.
Figure 6:
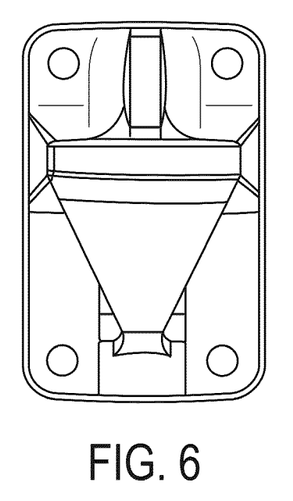
FIG. 6 is a right side view of the body portion of FIG. 3.
Figure 7:
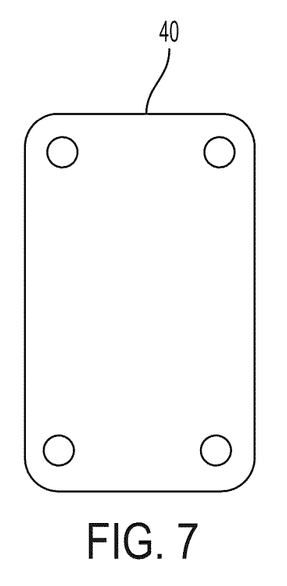
FIG. 7 is a left side view of the body portion e of FIG. 3.

One embodiment of the yielding fuse 25 is shown in FIG. 2. The yielding fuse 25 includes a first body portion 30 and a second body portion 35. The first and second body portions 30 and 35 are generally symmetrical, and are optionally identical to one another. FIGS. 5 to 7 show various views of an individual first or second body portion, to which reference may also be made. Each of the first 30 and second 35 body portions have one end 40 configured to be connected to a side or end 50 of the brace member (as shown in FIG. 1). In the preferred embodiment, the ends 40 include a connecting face for attachment of the body portions via bolts to the brace member. Other connections are also possible, for example welding to the brace member 20. It is preferred, however, that the attachment to the brace member 20 is a removable one. This permits ready replacement of the yielding fuse if needed. The first 30 and second 35 body portions are preferably connected opposite to one another so that the first 30 and second 35 body portions are symmetrical about the axis defined by the brace member 20 when the fuse is in its fully assembled state and connected to the braced frame 10.

Generally the description that follows will refer to features of the first body portion 30, however they are equally applicable to the second body portion 35 as the two are either symmetric or identical to each other. The body portion 30 has a base 45 which is displaced from the axis defined by the brace member 20, and a plurality of yielding arms 55 extending from the base 45 towards the axis, and more explicitly towards the axis of the brace member 20. However, the yielding arms 55 are eccentric with the axis of the brace member 20

Figure 3:
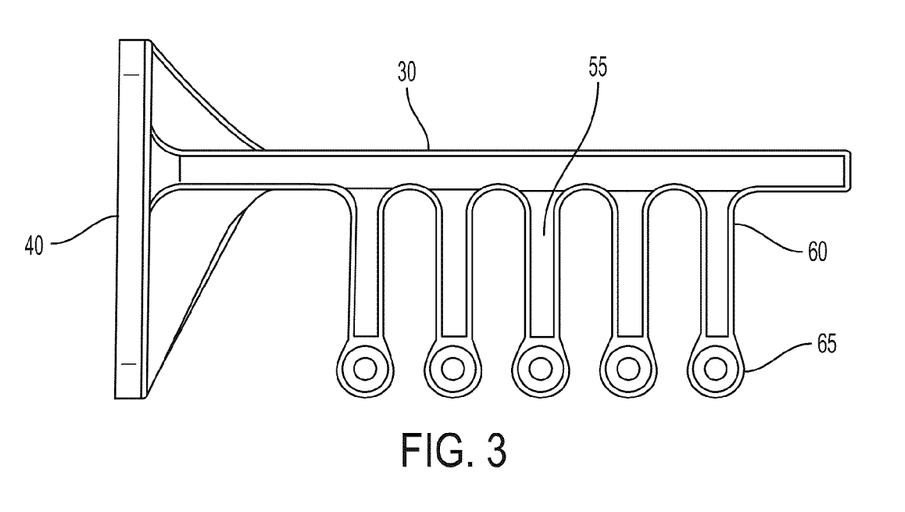
FIG. 3 is a front view of one body portion of the fuse of FIG. 2.
Figure 4:
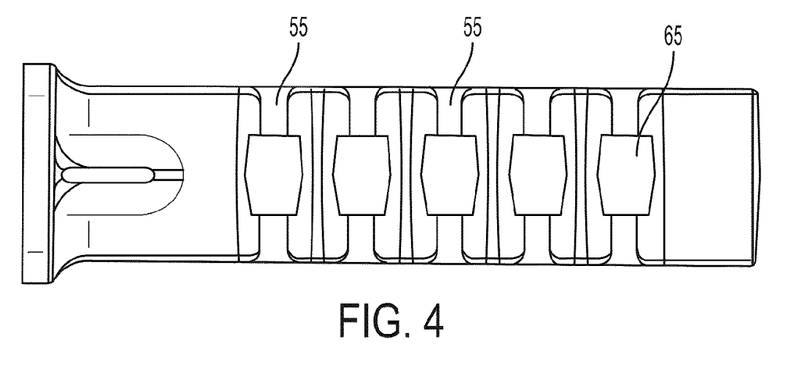
FIG. 4 is a top view of the body portion of FIG. 3.

The plurality of yielding arms 55 generally include a bottom portion 60 attached to the base 45 and a top portion 65 distal from the bottom portion 60 in a direction closer to the brace member axis. The yielding arms 55 are preferably tapered such that the bottom portion 60 is thicker than the top portion 65. Such tapering encourages yielding along the entire length of the yielding arm when the yielding fuse is activated. It is also contemplated that the yielding arms may be tapered along their height, such that the bottom portion and the top portion have the same thickness, however the thickness decreases along the profile of the yielding arms when viewed from the side, as in FIG. 3. The yielding arms may also be tapered in both directions.

Of importance to the invention is the inclusion of a force equilibrating means to connect the first and second body portions, and thereby link the mechanical response of the body portions when the yielding fuse is loaded. By connecting the body portions, bending moments and shear forces generated by the eccentricity of the yielding arms are internally balanced, and thus the force governing the design of the elastic portions of the fuse is generally axial in nature. The yielding arms can thus be produced using less material and ultimately be lighter than the teachings of the aforementioned Christopoulos et al. application. Furthermore, the force equilibrating means is designed to eliminate movement of each of the body portions and yielding arms with respect to one another during extreme loading, thus resulting in a more predictable yielding of the fuse. Ancillary advantages include simplifying the manner in which the yielding fuse can be connected to the brace member since the connection between the yielding fuse and the brace member has to account for axial forces only. In the prior art, accommodations had to be made to account for axial, shear, and flexural forces both in the design of the elastic portions of the fuse and in the connections to the brace member.

In order to accomplish the aforementioned force equilibrating, there is provided a first connecting plate 70 rigidly connecting the first body portion 30 to the second body portion 35. There is also preferably provided a second connecting plate 75 connecting the first body portion 30 to the second body portion 35 on an opposite side of the yielding fuse. The connecting plates 70, 75 may be steel plates of sufficient strength and rigidity that when coupled to the body portions results in a rigid and uniform yielding fuse including the connecting plates 70, 75 and the first and second body portions 30, 35.

The first connecting plate 70 is preferably connected to the first body portion 30, and the second connecting plate 75 connected to the second body portion 35 by aligning an underside of the respective connecting plate 70 or 75 with the top and bottom surfaces of the first 30 and second 35 connecting plates, respectively, and welding the connecting plates 70 or 75 to the top and bottom surfaces of the first 30 and second 35 body portions.

In order to connect the yielding fuse 25 to the brace frame 10, and thereby connect the brace 20 to the brace frame 10, a splice plate 85 is provided, and connected to the first 30 and second 35 body portions, preferably by virtue of being connected to the yielding arms 65 of the first 30 and second 35 body portions. As it is desirable to have the yielding of the yielding arms 65 be internally balanced, and specifically that corresponding yielding arms on the first 30 and second 35 body portions yield in a corresponding manner, the splice plate 85 is provided with a pair of support plates 90, spaced in a direction perpendicular to the brace member to accommodate the size of each of the top portions 65 of the yielding arms 55. The support plates 90 are axially centered with respect to the splice plate 85, with corresponding thru holes on either side of the splice plate. The support plates 90 may then be bolted to the top portion 65 of the yielding arms through the bolt holes shown on the top portion 65 of the yielding arms 55. The splice plate 85 may be connected to the brace frame in ways that are known in the art, for example, by being welded or bolted to a gusset plate as shown in FIG. 1. Thus, the yielding arms 55 of each of the first 30 and second 35 body portions are directly connected to the brace frame 10, and yielding of the yielding arms 55 becomes linked to the mechanical yielding of the brace member to which the yielding arms are connected. Thus, the respective elements can be sized and designed such that the yielding arms yield under catastrophic yielding conditions, as described earlier, rather than having the brace member yield.

When assembled, it is also preferred that the first connecting plate 70 is generally parallel and optionally co-planar with a front surface of the brace member and the second connecting plate 74 is generally parallel and optionally co-planar with a back surface of the brace member. This provides for a compact yielding fuse that does not protrude from the profiles of the brace member to a significant extent in the direction perpendicular to that of the brace member. This permits the yielding fuse to be implemented within the wall space of a building structure, with minimal obstruction to other elements.

Furthermore, by virtue of having the first and second connecting plates connected to each of the first and second body portions, the bending moments and shear forces generated by the eccentricity of the yielding arms under load conditions become internally balanced.

Figure 8:
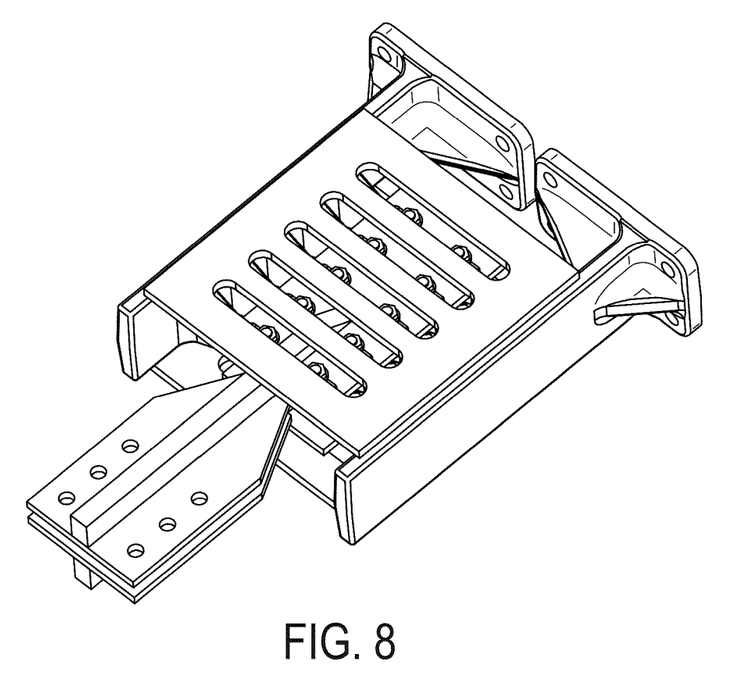
FIG. 8 is a perspective view of an assembled yielding fuse according to the invention.

FIG. 8 shows a fully assembled yielding fuse as herein described. As can be seen, the yielding fuse is more compact than prior art solutions. In addition, the unitary structure which binds the yielding arms of both the first body and the second body, on either side of the brace member provides for equilibrated forces within the yielding fuse, thus resulting in primarily axial loading of the body portions during load conditions.

It will be appreciated by those skilled in the art that the yielding devices of the present invention may be cast or fabricated from various different materials. In particular, any suitable cast material is possible, especially castable steels. For example, ASTM A958 Grade SC8620 Class 80/50 steel, with Si content less than 0.55% by weight, would be a suitable material for the yielding devices. Also suitable would be ASTM A216/A216M WCB and ASTM A352/A352M LCB. Using these grades ensures that the yielding device is a weldable base metal. Different alloys and different types of steel may be used for the casting depending on the properties that are required for the particular application.

The above-described embodiments are intended to be examples of the present invention and alterations and modifications may be effected thereto, by those of skill in the art, without departing from the scope of the invention that is defined solely by the claims appended hereto.

What is claimed is:

1. A yielding fuse for use in a brace assembly comprising:
   a first body portion configured to be connected at one end to a side of a brace member of the brace assembly;
   a second body portion configured to be connected at one end to another side of the brace member of the brace assembly;
   said first and second body portions positioned so as to be disposed on opposite sides of an axis defined by the brace member;
   each of said first and second body portions further including
      a base displaced from the axis;
      a plurality of yielding arms extending from said base towards the axis;
   a first connecting plate rigidly connecting said first body portion to said second body portion;
   a second connecting plate rigidly connecting said first body portion and said second body portion;
   wherein said first connecting plate is connected to a front surface of said first and second body portions and said second plate is connected to a back surface of said first and second body portions; and
   wherein said first and second connecting plates are welded to said first and second body portions, respectively.

2. The yielding fuse according to claim 1, wherein said plurality of yielding arms includes a bottom portion attached to said base and a top portion distal from said bottom portion.

3. The yielding fuse according to claim 2, wherein said plurality of yielding arms are tapered such that said bottom portion is thicker than said top portion.

4. The yielding fuse according to claim 2, further comprising a means for connecting said first and second body portions to a beam-column intersection of the brace assembly.

5. The yielding fuse according to claim 4, wherein said means for connecting comprises a splice plate connected to the beam-column intersection and a first support plate connected to the splice plate; said first support plate connected to at least two of said plurality of yielding arms to connect said splice plate to said first and second body portions.

6. The yielding fuse according to claim 5, further comprising a second support plate; wherein said first support plate and said second support plate are configured, sized and otherwise dimensioned to be connected to opposite ends of said top portion of said plurality of yielding arms on each of said first and second body portions.

7. The yielding fuse according to claim 1, wherein said first connecting plate is generally parallel and optionally co-planar with a front surface of the brace member and said second connecting plate is generally parallel and optionally co-planar with a back surface of the brace member.

8. A brace assembly comprising at least one brace member defining an axis and connected to a structural frame by a yielding fuse; wherein said yielding fuse comprises:
- a first body portion configured to be connected at one end to a side of said brace member;
- a second body portion configured to be connected at one end to another side of said brace member;
- said first and second body portions positioned so as to be disposed on opposite sides of said axis;
- each of said first and second body portions further including
  - a base displaced from the axis;
  - a plurality of yielding arms extending from said base towards the axis;
- a first connecting plate rigidly connecting said first body portion to said second body portion;
- a second connecting plate rigidly connecting said first body portion and said second body portion;
- wherein said first connecting plate is connected to a front surface of said first and second body portions and said second plate is connected to a back surface of said first and second body portions; and wherein said first and second connecting plates are welded to said first and second body portions, respectively.

9. The brace assembly according to claim 8, wherein said plurality of yielding arms includes a bottom portion attached to said base and a top portion distal from said bottom portion.

10. The brace assembly according to claim 9, wherein said plurality of yielding arms are tapered such that said bottom portion is thicker than said top portion.

11. The brace assembly according to claim 9, further comprising a means for connecting said first and second body portions to a beam-column intersection of the brace assembly.

12. The brace assembly according to claim 11, wherein said means for connecting comprises a splice plate connected to the beam-column intersection and a first support plate connected to the splice plate; said first support plate connected to at least two of said plurality of yielding arms to connect said splice plate to said first and second body portions.

13. The brace assembly according to claim 12, further comprising a second support plate; wherein said first support plate and said second support plate are configured, sized and otherwise dimensioned to be connected to opposite ends of said top portion of said plurality of yielding arms on each of said first and second body portions.

14. The brace assembly according to claim 11, wherein said first connecting plate is generally parallel and optionally co-planar with a front surface of the brace member and said second connecting plate is generally parallel and optionally co-planar with a back surface of the brace member.

* * * * *